United States Patent
Hou et al.

(10) Patent No.: US 7,808,602 B2
(45) Date of Patent: Oct. 5, 2010

(54) DISCHARGING EXCESSIVE LIQUID CRYSTAL IN A LIQUID CRYSTAL DISPLAY DEVICE

(75) Inventors: Chih-Chang Hou, Tainan County (TW); Chun-Chin Huang, Tainan County (TW)

(73) Assignee: Chimei Innolux Corporation (TW)

( * ) Notice: Subject to any disclaimer, the term of this patent is extended or adjusted under 35 U.S.C. 154(b) by 423 days.

(21) Appl. No.: 11/975,553

(22) Filed: Oct. 19, 2007

(65) Prior Publication Data

US 2008/0057820 A1     Mar. 6, 2008

Related U.S. Application Data

(62) Division of application No. 10/917,541, filed on Aug. 12, 2004, now Pat. No. 7,298,446.

(30) Foreign Application Priority Data

Aug. 14, 2003   (TW) .............................. 92122382 A
Sep. 1, 2003    (TW) .............................. 92124111 A

(51) Int. Cl.
*G02F 1/13*     (2006.01)
*G02F 1/1339*   (2006.01)

(52) U.S. Cl. .................. 349/154; 349/153; 349/189; 349/190; 349/106

(58) Field of Classification Search ................. 349/106, 349/153, 154, 189, 190
See application file for complete search history.

(56) References Cited

U.S. PATENT DOCUMENTS

| | | | |
|---|---|---|---|
| 5,511,591 A * | 4/1996 | Abe | 141/7 |
| 5,986,736 A | 11/1999 | Kodera et al. | |
| 6,259,505 B1 | 7/2001 | Makino | |
| 6,636,290 B1 | 10/2003 | Glownia et al. | |
| 6,646,709 B2 | 11/2003 | Matsumoto | |
| 6,671,030 B2 * | 12/2003 | Gyoda | 349/190 |
| 6,888,606 B2 | 5/2005 | Hinata et al. | |
| 6,937,315 B2 * | 8/2005 | Lee et al. | 349/153 |
| 6,940,576 B2 | 9/2005 | Imayama et al. | |
| 2002/0163614 A1 | 11/2002 | Hinata et al. | |
| 2003/0179338 A1 | 9/2003 | Kim | |
| 2004/0041976 A1 * | 3/2004 | Kida et al. | 349/187 |

* cited by examiner

*Primary Examiner*—Julie-Huyen L Ngo
(74) *Attorney, Agent, or Firm*—Trop Pruner & Hu, P.C.

(57) ABSTRACT

A liquid crystal display (LCD) includes a first substrate, a second substrate, and a sealing member. The sealing member is sandwiched between the first and second substrates, and forms a perimeter encircling a display area of the LCD device. After delivery of at least one drop of liquid crystal, any excessive liquid crystal trapped within the perimeter is discharged through an opening broken in the sealing member. The opening is plugged to enclose an amount of liquid crystal within the perimeter.

18 Claims, 6 Drawing Sheets

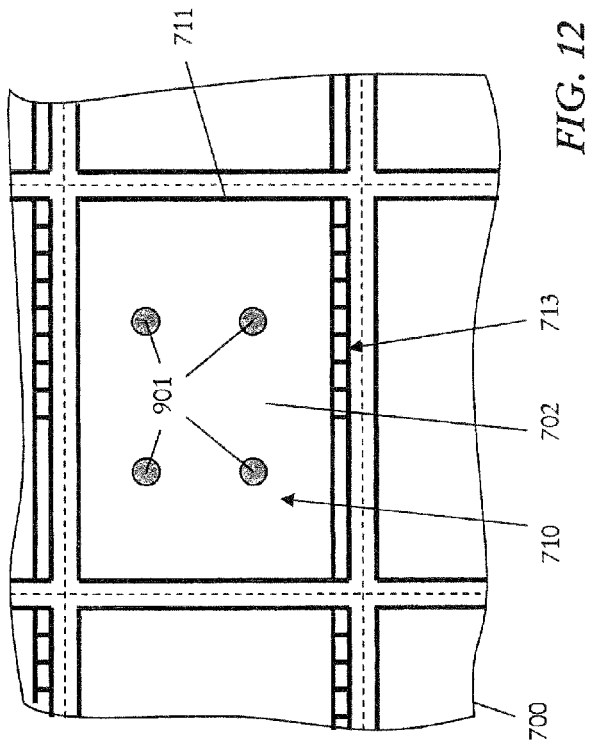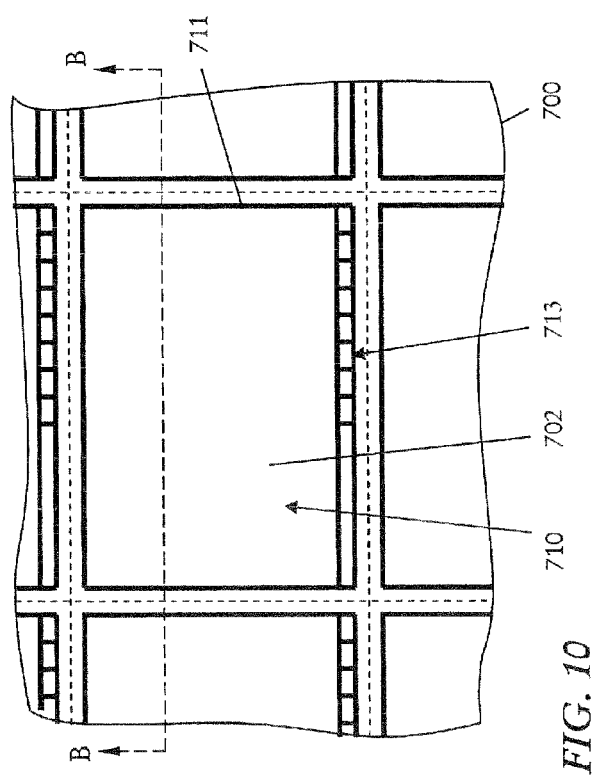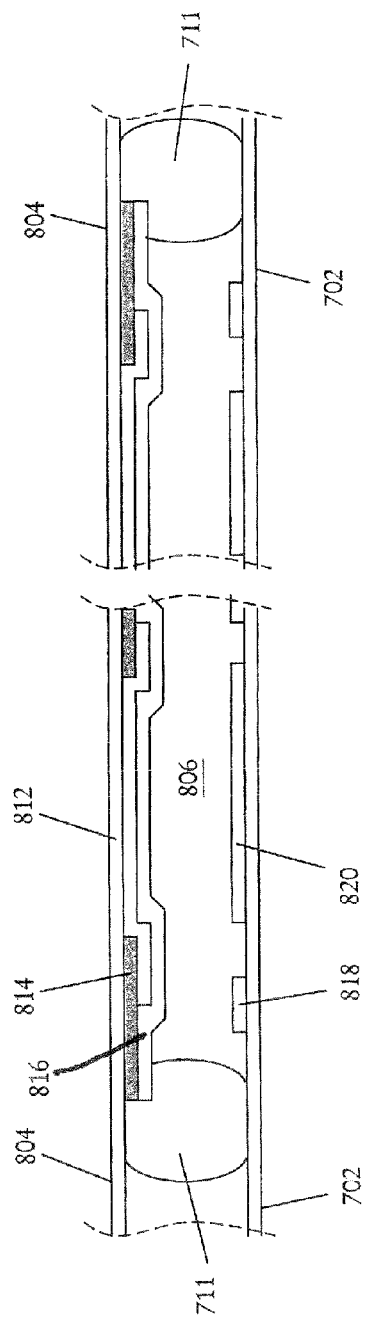

DISCHARGING EXCESSIVE LIQUID CRYSTAL IN A LIQUID CRYSTAL DISPLAY DEVICE

CROSS-REFERENCE TO RELATED APPLICATIONS

This is a divisional of U.S. Ser. No. 10/917,541, filed Aug. 12, 2004, now U.S. Pat. No. 7,298,446 which claims the benefit of Taiwan patent application No. 92122382, filed Aug. 14, 2003, and Taiwan patent application No. 92124111, filed Sep. 1, 2003, which are hereby incorporated by reference.

BACKGROUND

1. Field of the Invention

This invention relates in general to liquid crystal displays (LCD) and, in particular, to an LCD cell and the corresponding method of manufacturing thereof.

2. Technical Background

A typical LCD device is made up of two primary optical subassemblies: an LCD cell and a back-light module (BLM). BLM provides basic display light illumination for the display system while manipulation of birefringence of liquid crystal molecules in the LCD cell controls the light transmittance across the cell under different intensities and colors for each of the display pixels.

An LCD cell is basically a component that provides a liquid crystal-containing space between two transparent substrates. A sealing material is used to enclose the thin rectangular liquid crystal-containing space corresponding to the display area of the LCD device and also serves to secure the substrates relative to each other. The manufacture of an LCD cell involves the application of the sealant along predefined rectangular path around the display area utilizing a small-caliber dispenser nozzle. The sealant is subsequently hardened in a curing process in which cross-linking results in the polymerization of the sealing material.

One of the popular LCD cell manufacturing processes involves the filling of liquid crystal into the containing space in a vacuum-induced injection scheme. Such a process requires leaving a small opening at a selected location of the rectangular enclosing sealant. Normally the opening is shaped to allow for guided injection of liquid crystal into the containing space. Protrusions in a shaped opening frequently result in the accumulation of liquid crystal residue around themselves after liquid crystal is filled into the containing space via the opening, which is subsequently sealed such as by a resin-based material. Liquid crystal droplets outside of their intended containing space constitute problems to the LCD cell manufacturing. They constitute substantial contaminants and should be avoided. Also, such residues outside of the liquid crystal-containing space represent the waste of expensive material.

One method capable of reducing LCD cell production costs via avoidance of liquid crystal residue wastes is related to the one-drop filling (ODF) of liquid crystal into its intended containing space. An ODF scheme involves preparing a rectangular sealant enclosure over the surface of one of the transparent substrates, placing sufficient droplets of liquid crystal over the surface of either one of the two substrates, and aligning and securing the two together in a sealed manner.

Predetermined amount of liquid crystal material to be delivered in the droplets assist to reduce the waste of liquid crystal. The filling of liquid crystal into the containing space is also much faster than achievable in the vacuum-induced injection scheme described above. The reduction in both the material amount and the processing time results in significantly reduced manufacturing costs.

However, capacity of the liquid crystal-containing space between the two transparent substrates alters due to various factors including, for example, slight twisting of either or both of the substrates. If the amount of liquid crystal delivered by the drops is insufficient, the containing space becomes correspondingly larger than it should be, air bubbles may form in the cell. On the other hand, if the containing space is relatively smaller than for the delivered liquid crystal droplets, the amount of the liquid crystal material becomes excessive, gravity mura may easily arise in the displace area of the cell. Regardless of whether it is excessive or insufficient liquid crystal in the containing space, an LCD cell is discarded as defective. Conventional ODF schemes allow no room for repair of these defective LCD cells. They are simply thrown away and wasted.

SUMMARY OF THE INVENTION

There is therefore the need for an LCD cell and its corresponding method that can be processed in a manufacturing operation allowing for rework for enclosing an optimized amount of liquid crystal in the cell for defect-free display operation.

The present invention thus provides a liquid crystal display cell for a liquid crystal display device comprising: a first transparent substrate; a second transparent substrate; and a sealing member, wherein said sealing member being sandwiched between and fixedly binding said first and second transparent substrates in a structural alignment for image displaying operation of said liquid crystal display cell; and said sealing member forming a perimeter encircling a display area of said liquid crystal display cell and having a discharge port at a location on said perimeter; said perimeter enclosing an optimized amount of liquid crystal obtained after the excessive liquid crystal trapped within said perimeter during the manufacture of said liquid crystal display cell is discharged out of said liquid crystal display cell through said discharge port; and said perimeter sealedly enclosing said optimized amount of liquid crystal therein after said discharge port is plugged for defect-free implementation of said image displaying operation.

The present invention also provides a liquid crystal display cell for a liquid crystal display device comprising: a first transparent substrate; a second transparent substrate; and a sealing member, wherein said sealing member being sandwiched between and fixedly binding said first and second transparent substrates in a structural alignment for image displaying operation of said liquid crystal display cell; and said sealing member forming a perimeter encircling a display area of said liquid crystal display cell and having an array of a plurality of storage chambers formed along a location on said perimeter; said perimeter enclosing an optimized amount of liquid crystal obtained after the excessive liquid crystal trapped within said perimeter during the manufacture of said liquid crystal display cell is discharged into at least one of said plurality of storage chambers through openings broken between the containing space of said perimeter and the storage space of each of said at least one storage chambers; and said perimeter sealedly enclosing said optimized amount of liquid crystal therein after said discharge for defect-free implementation of said image displaying operation.

The present invention further provides a method of manufacturing a liquid crystal display cell for a liquid crystal display device comprising the steps of: a) deploying a sealing member on a first substrate; said sealing member forming a perimeter encircling a display area of said liquid crystal display cell; b) delivering at least one drop of liquid crystal on either one of said first substrate and a second substrate; c) assembling said first substrate and said second substrate wherein said first and second substrates sandwiching said sealing member and are aligned for image displaying operation of said liquid crystal display cell; d) breaking a discharge port on said perimeter; e) discharging any excessive liquid crystal trapped within said perimeter out of said liquid crystal display cell through said discharge port; and e) plugging said discharge port of said sealing member thereby obtaining an optimized amount of liquid crystal enclosed in said perimeter for defect-free implementation of said image displaying operation.

The present invention further provides a method of rework manufacturing a liquid crystal display cell for a liquid crystal display device comprising the steps of: a) deploying a sealing member on a first substrate; said sealing member forming a perimeter encircling a display area of said liquid crystal display cell and having an array of a plurality of excessive liquid crystal storage chambers positioned at a location adjacent to said perimeter; b) delivering at least one drop of liquid crystal on either one of said first substrate and a second substrate; c) assembling said first substrate and said second substrate wherein said first and second substrates sandwiching said sealing member and are aligned for image displaying operation of said liquid crystal display cell; d) breaking at least one opening between the containing space of said perimeter and the storage space of each of said at least one storage chambers; and e) discharging any excessive liquid crystal trapped within said perimeter into at least one of said plurality of storage chambers thereby enclosing an optimized amount of liquid crystal in said perimeter for defect-free implementation of said image displaying operation.

BRIEF DESCRIPTION OF THE DRAWINGS

FIG. 10 is a plane view schematically showing an LCD cell prepared on a mother glass with a number of storage chambers for excessive liquid crystal in accordance with another preferred embodiment of the present invention;

FIG. 11 is a cross-sectional view illustrating a section of the LCD cell of FIG. 7;

FIG. 12 is a plane view schematically showing the delivery of drops of liquid crystal in the containing space of the LCD cell of FIG. 7;

DETAILED DESCRIPTION

Figure 1:
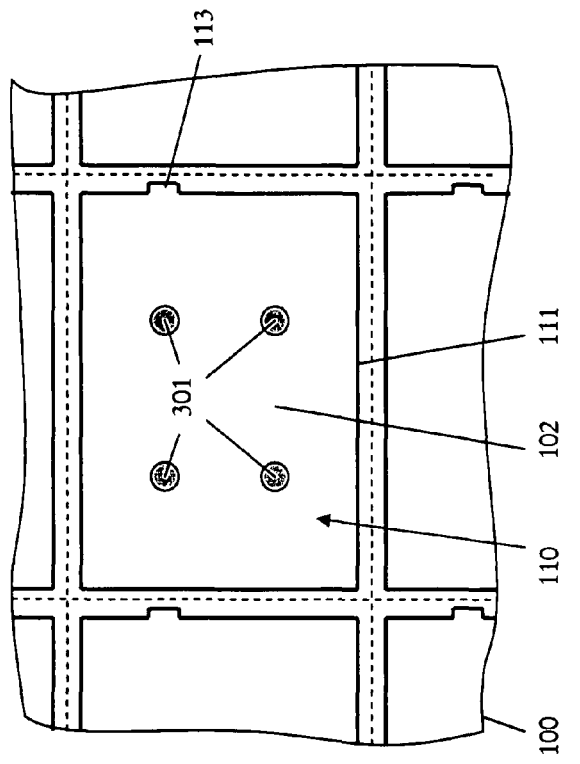
FIG. 1 is a plane view schematically showing an LCD cell prepared on a mother glass with a sealed discharge port of the liquid crystal containing space in accordance with a preferred embodiment of the present invention.
Figure 2:
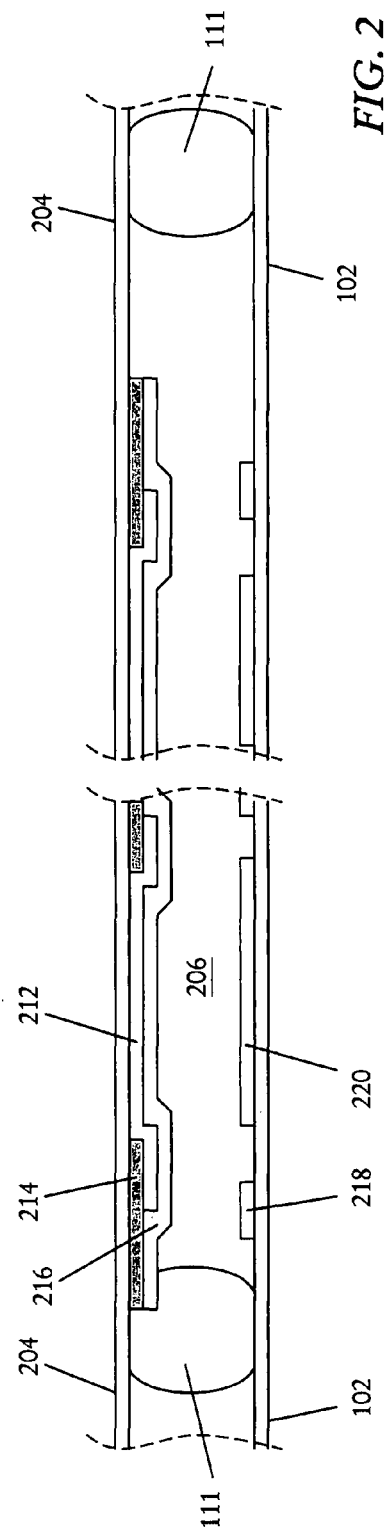
FIG. 2 is a cross-sectional view illustrating a section of the LCD cell according to a preferred embodiment of the present invention.

FIG. 1 is a plane view schematically showing an LCD cell prepared on a mother glass with a sealed discharge port of the liquid crystal containing space in accordance with the teaching of the present invention. Cross-sectional view of FIG. 2 illustrates a section of the LCD cell constructed on the mother glass of FIG. 1 taken along the A-A line. Reference is made simultaneously to the two drawings for a description of a preferred embodiment of the LCD cell structure of the present invention.

Preferably, multiple LCD cells of the present invention can be made from a single mother glass. FIG. 1 shows a section of a mother glass 100, which is used as the basic substrate for the batch construction of LCD cells including cell 110 shown in its entirety. Each of the individual cells fabricated on the mother glass 100 can be separated physically in a later processing stage as will be described subsequently. Dashed lines in FIG. 1 identify the boundary between cells on the same mother glass 100.

At this early stage of fabrication on the mother glass, each of the cells is seen defined by a sealing member generally encircling its own display area. An LCD cell constructed in accordance with the teaching of the present invention comprises a pair of transparent substrates aligned parallel to each other and forming a liquid crystal-containing space in between. In this depicted example, the two substrates include substrate 102 cut from the mother glass 100.

The two substrates are fixed to each other by a sealing member 111, which has an excess liquid crystal discharge port 113. As is shown, sealing member 111 for cell 110 is configured into a rectangular enclosure generally deployed along the edge of its boundary on the mother glass 100. The sealing member 111 can be applied over the surface of the mother glass 100 as a viscous material using an automatic dispenser that comprises a nozzle of predetermined sealant discharge orifice size. After the sealing member 111 is cured in the subsequent processing stage, it serves to seal the liquid crystal-containing space between the two substrates. Preferably, liquid crystal is filled into the containing space in, for example, an ODF process step as will be described below.

In a preferred embodiment of the LCD cell in accordance with the present invention such as exemplified in FIG. 2, substrate 102 (cut from the mother glass 100 of FIG. 1) has a plurality of color filter sections arranged in a matrix of display pixels on the internal surface thereof. Generally identified by the reference numeral 212 in the drawing, each of the color filter sections may comprise independent filters for, each of the three primary colors. In between every pair of consecutive color filter sections 212 in the matrix, segments of a light-shielding framework 214 is formed to avoid mutual interference between neighboring image display pixels. A transparent electrode layer 216 hosting a network of electrodes is formed covering both the color filter sections 212 and the light-shielding framework 214 over the entire surface area of the substrate 204.

Over the internal surface of the other substrate 102 opposite to 204, as also illustrated in FIG. 2, is another matrix of thin-film transistors (TFT) as well as a matrix of pixel electrodes. Generally indicated by reference numeral 218 in the cross-sectional view, each of the transistors in the matrix is connected to a network of parallel data and gate lines (both not shown in the drawing). As is comprehensible, each of the thin-film transistors 218 for a corresponding color filter section 212 can be located adjacent to where a pair of data and gate lines intersect. Similarly, each of the pixel electrodes 220 is placed within the gridwork defined by the intersecting data and gate lines and substantially aligned with a corresponding color filter section 212. All the TFTs, together with their corresponding color filter sections 212 and pixel electrodes 220 are arrayed in a display matrix corresponding to the image pixel matrix system within the display area of the LCD cell.

Figure 17:
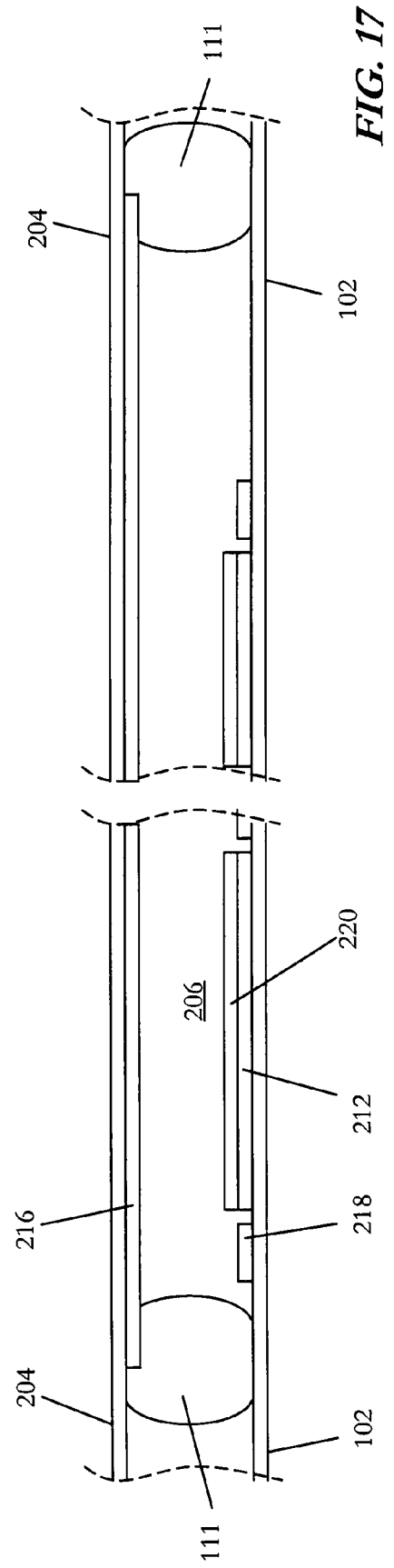
FIG. 17 depicts a color-filter-on-array (COA) device with common electrode.

In another preferred embodiment of the LCD cell in accordance with the present invention as depicted in FIG. 17 (which has elements sharing reference numerals with FIG. 2), the pair of substrates may include one featuring a color-filter-on-array (COA) filtering system and another paired opposite substrate with a common electrode 216. The positions of the pixel electrode 220 and color filter 212 can be exchanged in a different implementation. In still another embodiment of the present invention, the substrate pair can be replaced with one featuring the in-plane switching mode design.

Figure 3:
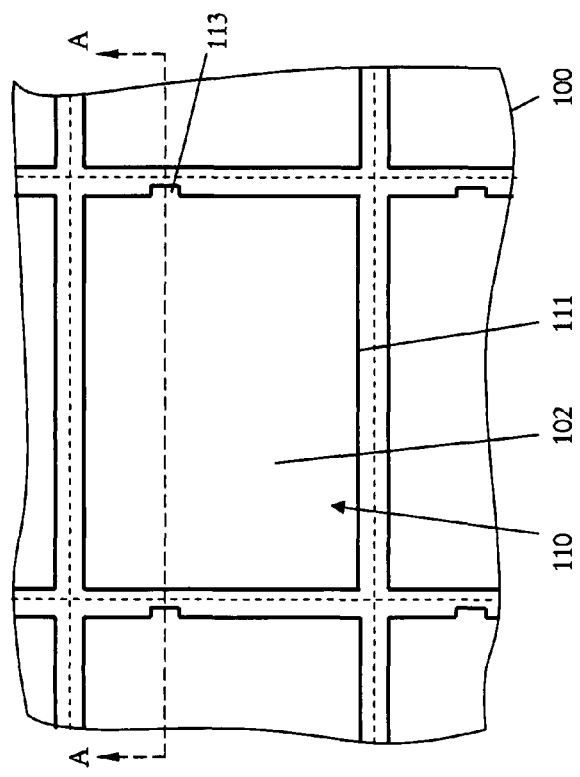
FIG. 3 is a plane view schematically showing the delivery of drops of liquid crystal in the containing space of the LCD cell of FIG. 1.

FIG. 3 is a plane view schematically showing the delivery of at least one drop 301 of liquid crystal in the containing space of the LCD cell in an ODF procedure. Amount of liquid crystal delivered in the at least one drop 301 is predetermined to match the volumetric capacity of the liquid crystal-containing space. Preferably, the delivery amount is slightly larger than the exact amount and also to cover the tolerance among different sets of substrate pairs for the mass production of the inventive LCD cells.

Subsequently, a second substrate is placed on top of the structure of FIG. 3. This second substrate is placed in position with necessary alignment so that the color filter matrix can be properly aligned with the TFT matrix system described above.

Figure 4:
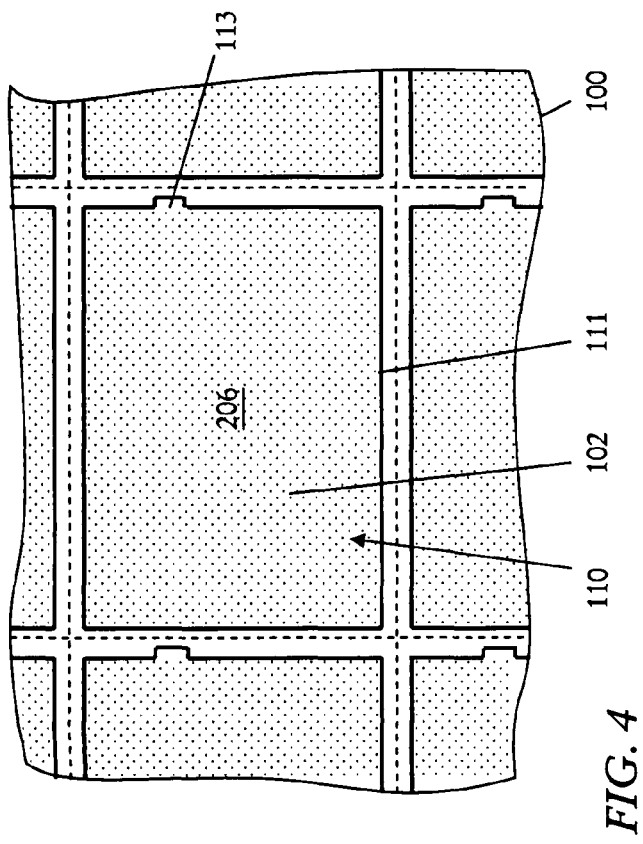
FIG. 4 is a plane view schematically illustrating the spreading of liquid crystal in the containing space of the LCD cell after the aligned placement of the second substrate over the structure of FIG. 3.

FIG. 4 is a plane view schematically illustrating the spreading of liquid crystal in the containing space of the LCD cell after the aligned placement of the second substrate over the structure of FIG. 3. The placement of the top substrate in position spreads the liquid crystal in the containing spaces for all cells batch-fabricated on the mother glass. For example, liquid crystal drops 301 delivered in FIG. 3 become the filling liquid crystal 206 in the LCD cell 110 of FIG. 4. The placement of the top substrate also completes the construction of the sealed liquid crystal-containing space. The sealing member 111 may then be hardened to combine the two substrates in a permanently fixed manner.

After the two substrates are secured relative to each other, the entire assembly is subject to a cutting procedure. The cutting can be performed along the cutting line generally identified in FIG. 4 by the dashed line. In a preferred embodiment of the present invention, this cutting to release the multiple LCD cells from the mother glass can be performed along the dashed lines in FIG. 4 without breaking the discharge port 113. This prevents the contamination by excessive liquid crystal coming out of the containing space during this mass separation processing.

Figure 5:
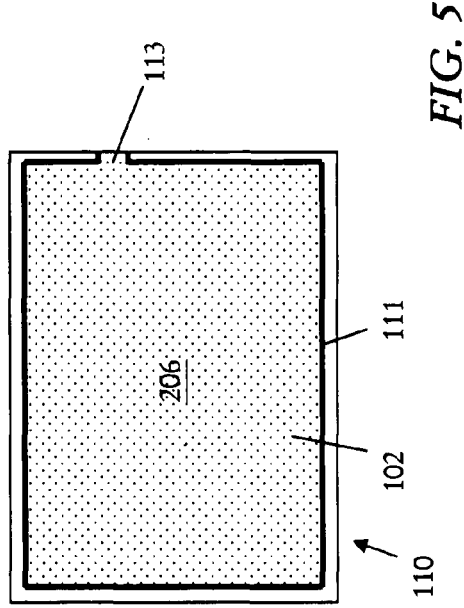
FIG. 5 is a plane view schematically showing the LCD cell cut free from the mother glass system of FIG. 4.

A subsequent cutting can then be performed directly cutting through the channel mouth of the discharge port 113 when an individual LCD cell such as cell 110 shown in FIG. 5 can be processed. The result of this subsequent cutting achieves an LCD as is schematically illustrated in the plane view of FIG. 5. Normally, the discharge port 113 allows for the containment of the discharge of excess liquid crystal delivered in the ODF process. With adequate control of the ODF delivery amount, the excessive liquid crystal can be contained entirely within the containing space. This leaves no contaminating liquid crystal residue over the external surface of the sealing member 111.

Figure 6:
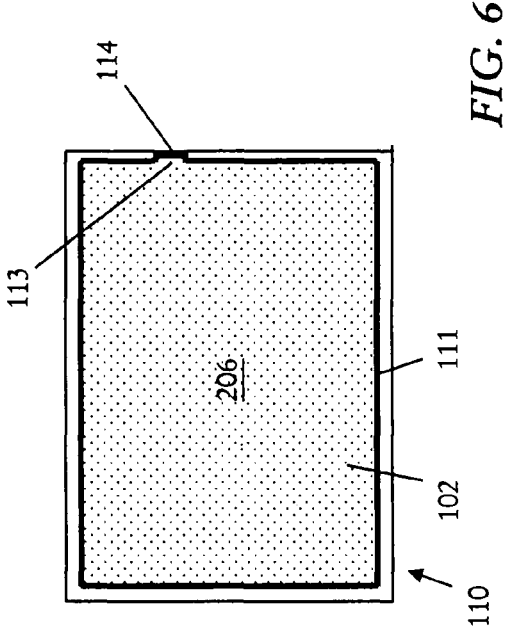
FIG. 6 is a plane view schematically showing the sealing of the discharge port of the containing space of the LCD cell of FIG. 5.

If, however, excessive liquid crystal is more than can be contained within the containing space, it can be discharged off the LCD cell without problem once the discharge port 113 is cut open. Methods such as cleaning known in the art can then be used to completely remove all excessive liquid crystal off the cell. After this, the discharge port 113 can be sealed utilizing a plugging sealant 114 and achieving an LCD cell assembly 610 as shown in FIG. 6 containing adequate amount of liquid crystal for optimized image display. FIG. 6 is a plane view schematically showing the sealing of the discharge port of the containing space of the LCD cell of FIG. 5.

Preferably, the main enclosing sealing member 111 for the containing space and the plugging sealant 114 for the discharge port 113 are radiation-hardened sealant. Radiation-cured sealant materials such as UV-hardened ones are more preferable than heat-cured.

Although not shown in the drawings, an LCD cell constructed in accordance with a preferred embodiment of the present invention may have the deployment of a matrix of regularly-populated spacers between its two substrates with a distribution density much higher than possible in the conventional cells. Spacers are used inside the liquid crystal-containing space of the cell to assist to support the rigidity of the thin and large-area substrates in order to prevent both from collapsing toward each other.

Spacer population density inside the liquid crystal-containing space for conventional LCD cells manufactured employing ODF procedure is typically less than 0.15%, measuring the total spacer footprint area with respect to overall LCD cell display area. Lower spacer population density allows for relatively larger process window, which leads to easier manipulation and better result of ODF schemes in the fabrication of LCD cells. On the other hand, higher spacer population density results into higher cell mechanical rigidity. In accordance with the teaching of the present invention, the spacer population density becomes a disengaged factor for ODF process window in the manufacturing of an LCD cell. It is therefore, in accordance with the present invention, possible to deploy spacers in the cell at a population density much higher than the typical 0.15% conventionally achievable. In a preferred embodiment, it is possible to deploy spacers at a density up to nearly 2% of the total display area. This leads to an extremely rigid cell structure.

Figure 8:
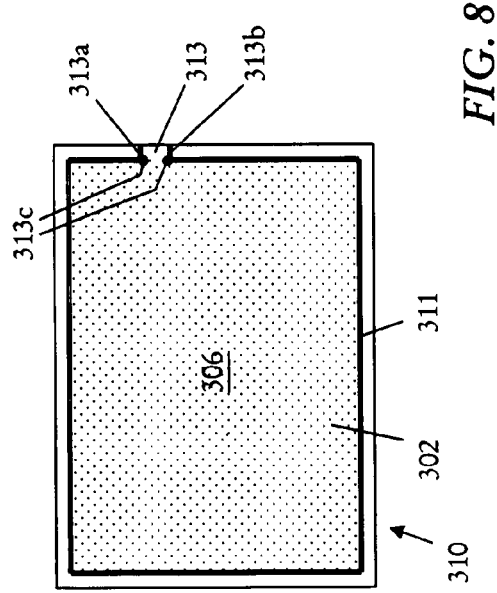
FIG. 8 is a plane view schematically showing the LCD cell cut free from the mother glass system of FIG. 7.
Figure 9:
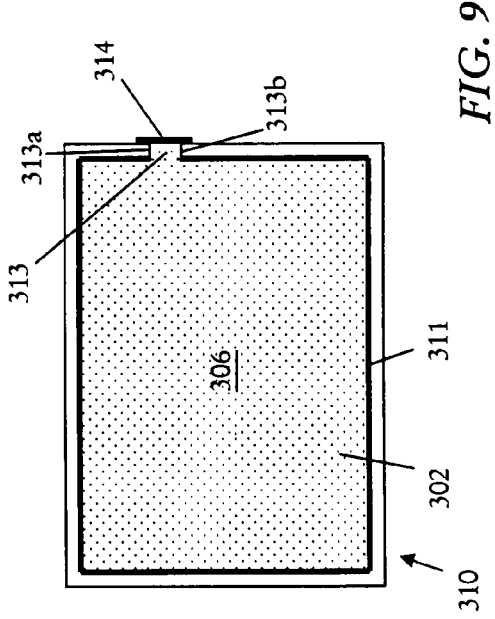
FIG. 9 is a plane view schematically showing the sealing of the discharge port of the containing space of the LCD cell of FIG. 8.
Figure 7:
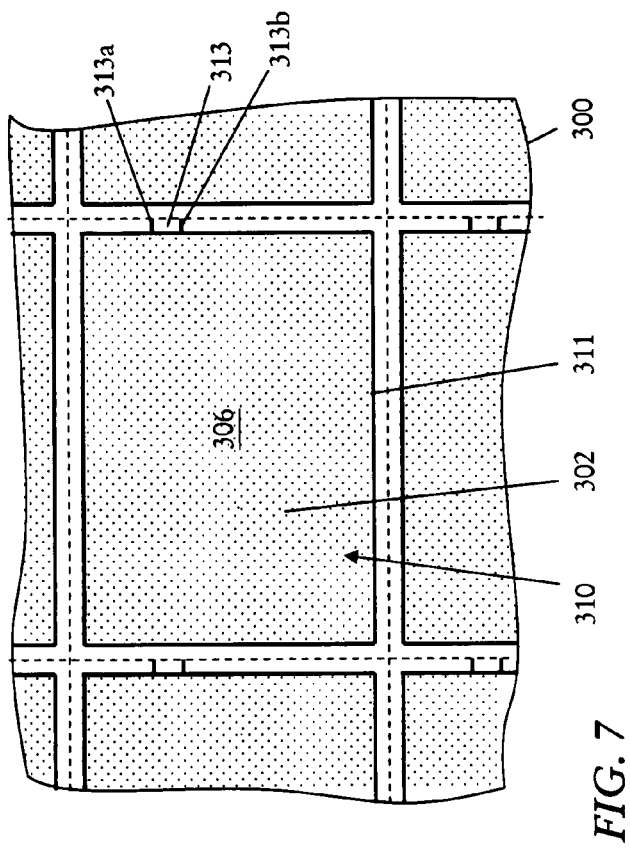
FIG. 7 is a plane view schematically illustrating the spreading of liquid crystal in the containing space of the LCD cell in accordance with a second preferred embodiment of the present invention.

A second preferred embodiment is schematically illustrated in FIG. 7, FIG. 8, and FIG. 9. A subsequent cutting can then be performed directly cutting through the channel mouth of the discharge port 313 when an individual LCD cell such as cell 310 shown in FIG. 8 can be processed which is subject to the problem of having excessive liquid crystal sealed in its containing space. Not every LCD cell cut loose from the mother glass requires this rework processing of excessive liquid crystal discharge. However, such rework does provide improvement to the overall costs of LCD cell manufacture due to the possibility of easy salvage of cells with excessively-filled liquid crystal.

The result of this rework-cutting achieves an LCD as is schematically illustrated in the plane view of FIG. 8. The opening of the discharge port 313 can be achieved by breaking open the section of the sealing member 311 in between the two port-defining sections 313a and 313b. The opening can be facilitated by, for example, burning the opening section utilizing a laser beam of adequate power and wavelength. Such a laser beam can open up the discharge port without inflicting damage to the other components of the cell close to the location of this burn-opening partly due to the fact that substrates enclosing the liquid crystal are transparent glass-based.

In case of laser beam opening of the discharge port 313 as depicted in FIG. 8, the opening section of the sealing member 311 can be reduced to ball-like residuals 313c at the edges of the opening. Normally, the discharge port 313 allows for the containment of the discharge of excess liquid crystal delivered in the ODF process. With adequate control of the ODF delivery amount, the excessive liquid crystal can be contained entirely within the channel space of the discharge port 313. This leaves no contaminating liquid crystal residue over the external surface of the sealing member 311.

If, however, excessive liquid crystal is more than can be contained within the channel of the discharge port 313, it can be discharged off the LCD cell without problem once the discharge port 313 is cut open. Methods such as cleaning known in the art can then be used to completely remove all excessive liquid crystal off the cell. After this, the discharge port 313 can be sealed utilizing a plugging sealant 314 and achieving an LCD cell assembly 310 as shown in FIG. 9 containing adequate amount of liquid crystal for optimized image display. FIG. 9 is a plane view schematically showing the sealing of the discharge port of the containing space of the LCD cell of FIG. 8.

Preferably, the main enclosing sealing member 311 for the containing space and the plugging sealant 314 for the discharge port 313 are radiation-hardened sealant. Radiation-cured sealant materials such as UV-hardened ones are more preferable than heat-cured.

Although not shown in the drawings, an LCD cell constructed in accordance with the second preferred embodiment of the present invention may have the deployment of a matrix of regularly-populated spacers between its two substrates with a distribution density much higher than possible in the conventional cells. Spacers are used inside the liquid crystal-containing space of the cell to assist to support the rigidity of the thin and large-area substrates in order to prevent both from collapsing toward each other.

Typical spacer population density inside the liquid crystal-containing space for conventional LCD cells is approximately 0.15%, measuring the total spacer footprint area with respect to overall LCD cell display area. Lower spacer population density allows for relatively larger process window, which leads to easier manipulation and better result of ODF schemes in the fabrication of LCD cells. On the other hand, higher spacer population density results into higher cell mechanical rigidity. In accordance with the teaching of the present invention, the spacer population density becomes a disengaged factor for ODF process window in the manufacturing of an LCD cell. It is therefore, in accordance with the present invention, to deploy spacers in the cell at a population density much higher than the conventionally-optimized 0.15%. In a preferred embodiment, it is possible to deploy the spacers up to 2% of the total display area, leading to an extremely rigid cell structure.

FIG. 10 is a plane view schematically showing an LCD cell prepared on a mother glass with a number of storage chambers for excessive liquid crystal in accordance with another preferred embodiment of the present invention. Cross-sectional view of FIG. 11 illustrates a section of the LCD cell of constructed on the mother glass of FIG. 10 taken along the B-B line. Reference is made simultaneously to the two drawings for a description of the preferred embodiment of the LCD cell structure of the present invention.

Preferably, LCD cells of the present invention can be made in multiples from a single mother glass. FIG. 10 shows a section of a mother glass 700, which is used as the basic substrate for the batch construction of LCD cells including cell 710 shown in its entirety. As is comprehensible, each of the individual cells fabricated on the mother glass can be separated physically in a later processing stage as will be described subsequently. Dashed lines in the drawing identify the boundary between cells on the same mother glass 700.

At this early stage of fabrication on the mother glass, each of the cells is seen defined by a sealing member generally encircling its own display area. An LCD cell constructed in accordance with the teaching of the present invention comprises a pair of transparent substrates aligned parallel to each other and forming a liquid crystal-containing space in between. In this depicted example, the two substrates include substrate 702 cut from the mother glass 700.

Figure 13:
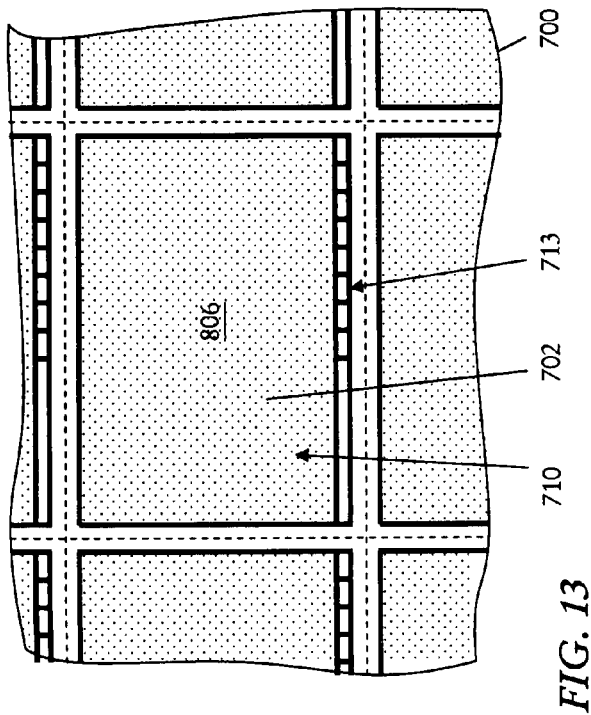
FIG. 13 is a plane view schematically illustrating the spreading of liquid crystal in the containing space of the LCD cell after the aligned placement of the second substrate over the structure of FIG. 9.

The two substrates are fixed to each other by a sealing member 711, which has an array of excess liquid crystal storage chambers generally identified by reference numeral 713. The LCD cell structural configuration in accordance with another embodiment of the present invention illustrated in FIG. 13 shows an arrangement of such an array of storage chambers made ready for reception of excessive liquid crystal to be removed from the main containing space of the cell. As is shown, an LCD cell of the present invention may be equipped with a number of storage chambers arranged in an arrayed manner near one edge of the display area of the cell. Each of the chambers is preferably made from the same sealing member material used to enclose the liquid crystal containing space 806 for the cell assembly 710. As is comprehensible, each of the chambers may be constructed to have the same or different volumetric capacity.

As is shown in FIG. 13, sealing member 711 is configured into a rectangular enclosure generally deployed along the edge of its boundary on the mother glass 700. The sealing member 711 can be applied over the surface of the mother glass 700 as a viscous material using an automatic dispenser that comprises a nozzle of predetermined sealant discharge orifice size. When the sealing member 711 is cured in the subsequent processing stages, it serves to seal the liquid crystal-containing space between the two substrates. Preferably, liquid crystal is filled into the containing space in, for example, an ODF process step as will be described below.

In the preferred embodiment of the LCD cell in accordance with the present invention such as exemplified in FIG. 11, substrate 804 has a plurality of color filter sections arranged in a matrix of display pixels on the internal surface thereof. Generally identified by the reference numeral 812 in the drawing, each of the color filter sections may comprise independent filters for each of the three primary colors. In between every pair of consecutive color filter sections 812 in the matrix, segments of a light-shielding framework 814 is formed to avoid mutual interference between neighboring image display pixels. A transparent electrode layer 816 hosting a network of electrodes is formed covering both the color filter sections 812 and the light-shielding framework 814 over the entire surface area of the substrate 804.

Over the internal surface of the other substrate 804 opposite to 702, as also illustrated in FIG. 11, is another matrix of thin-film transistors (TFT) as well as a matrix of pixel electrodes. Generally indicated by reference numeral 818 in the cross-sectional view, each of the transistors in the matrix is connected to a network of parallel data and gate lines (both not shown in the drawing). As is comprehensible, each of the thin-film transistors 818 for a corresponding color filter section 812 can be located adjacent to where a corresponding pair of data and gate lines intersect. Similarly, each of the pixel electrodes 820 is placed within the gridwork defined by the intersecting data and gate lines and substantially aligned with a corresponding color filter section 812. All the TFTs, together with their corresponding color filter sections 812 and pixel electrodes 820 are arrayed in a display matrix corresponding to the image pixel matrix system within the display area of the LCD cell.

In another preferred embodiment of the LCD cell in accordance with the present invention, the pair of transparent substrates may include one featuring a color-filter-on-array (COA) filtering system and another paired opposite substrate with a corresponding electrode system. In still another embodiment of the present invention, the substrate pair can be replaced with one featuring the in-plane switching mode design.

FIG. 12 is a plane view schematically showing the delivery of at least one drop 901 of liquid crystal in the containing space of the LCD cell in an ODF procedure. Amount of liquid crystal delivered in the drop 901 is predetermined to match the volumetric capacity of the liquid crystal-containing space. Preferably, the delivery amount is slightly larger than the exact amount and also to cover the tolerance among different sets of substrate pairs for the mass production of the inventive LCD cells.

Subsequently, a second substrate is placed on top of the structure of FIG. 12. As is comprehensible, this second substrate is placed in position with necessary alignment so that the color filter matrix can be properly aligned with the TFT matrix system described above.

FIG. 13 is a plane view schematically illustrating the spreading of liquid crystal in the containing space of the LCD cell after the aligned placement of the second substrate over the structure of FIG. 12. The placement of the top substrate in position spreads the liquid crystal in the containing spaces for all cells batch-fabricated on the mother glass. For example, liquid crystal drops 901 delivered in FIG. 12 become the filling liquid crystal 806 in the LCD cell 710 of FIG. 13. In this process, liquid crystal trapped inside the containing space of a cell may be in excess to the volumetric capacity optimized for the containing space. As is known to those skilled in the art, excessive liquid crystal in the containing space represents quality problem for the LCD cell. For those cells trapping excessive amount of liquid crystal, rework processing after the physical separation from the mother glass system become necessary. The inventive cell structure described herein allows for easy rework adjustment as will be described in the following paragraphs.

The placement of the top substrate also completes the construction of the sealed liquid crystal-containing space regardless of whether the liquid crystal filled is excessive or not. The sealing member 711 may then be hardened to combine the two substrates in a permanently fixed manner. After the two substrates are secured relative to each other, the entire assembly is subject to a cutting procedure. The cutting can be performed along the cutting line generally identified in FIG. 13 by the dashed line.

Figure 14:
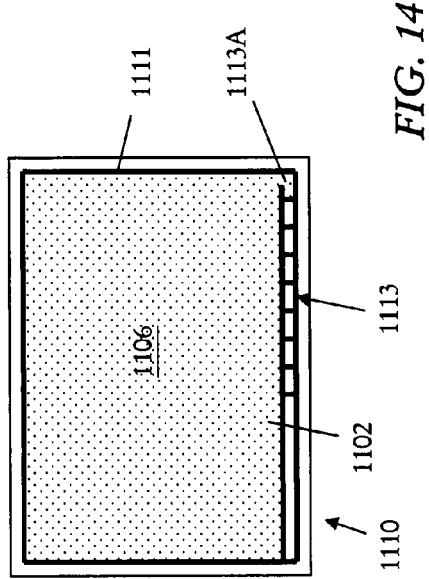
FIG. 14 is a plane view schematically showing the LCD cell cut free from the mother glass system of FIG. 10 and with one storage chamber opened for receiving excessive liquid crystal discharged from the main containing space.

As is schematically illustrated in the plane view of FIG. 14, the LCD cell 710 is cut free from the mother glass system of FIG. 13. The array of excessive liquid crystal storage chambers 713 allows for the containment of the discharge of excess liquid crystal delivered in the ODF process when necessary. With adequate control of the ODF delivery amount, the excessive liquid crystal can be contained entirely within array of storage chambers 713. Each of FIGS. 14, 15 and 16 respectively illustrates an embodiment of the inventive LCD cell structural configuration reworked for adjustment to achieve the containment of the optimized amount of liquid crystal in the containing space for defect-free operation of the display device constructed out of the cell.

Figure 16:
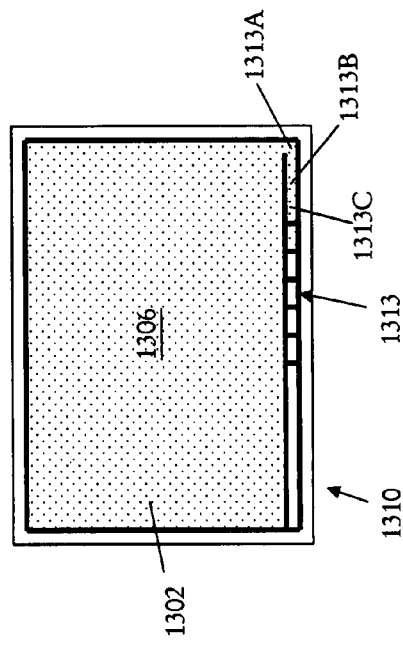
FIGS. 15 and 16 are plane views schematically showing the opening up of more than one storage chamber for the storage of excessive liquid crystal from the containing space of the LCD cell.
Figure 15:
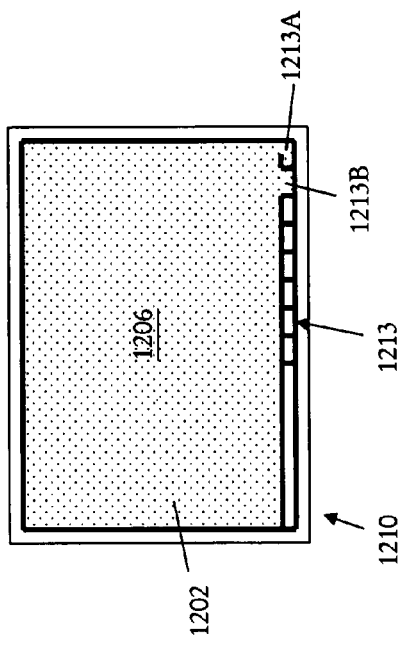

FIG. 14 is a plane view schematically showing the LCD cell cut free from the mother glass system of FIG. 13 and with one storage chamber opened for receiving excessive liquid crystal discharged from the main containing space. FIGS. 15 and 16 are plane views schematically showing the opening up of more than one storage chamber for the storage of excessive liquid crystal from the containing space of the LCD cell.

LCD cell 1100 shown in the plane view of FIG. 14 has a ready and easy remedy in case excessive liquid crystal is sealed inside the containing space. In case of such a defect, the sealing member 1111 for the cell 1110 at the section separating the storage chamber 1113A can be broken as is illustrated in the drawing. This can be achieved via, for example, irradiation by a laser beam set to predetermined power rating. Such irradiation can be conveniently conducted via either of the transparent substrates of the cell.

Opening up of the storage chamber 1113A in the cell 1110 of FIG. 14 allows for the discharge of the excessive liquid crystal trapped inside the containing space 1106. As is comprehensible, structural sections of the array of storage chambers 1113 of the main sealing member 1111 can be located under either of the two cell substrates where no other cell component such as electrodes or electrically conductive trace is formed. Also as is comprehensible, discharge of excessive liquid crystal from the main containing space 1106 into the opened storage chamber can be automatic as a result of internal pressure in the containing space due to the excessiveness of the enclosed liquid crystal. Alternatively, external pressure may also be employed to discharge the excess of liquid crystal in the containing space into the storage chamber opened.

In case one storage chamber 1113A is insufficient to receive the entire excessive amount needs to be discharged from the main containing space, more storage chambers can be opened to the main space. The number of storage chambers need to be opened is dependent on the amount of liquid crystal that is excessive to necessary. FIGS. 15 and 16 are plane views schematically showing the opening up of more than one storage chamber for the storage of excessive liquid crystal from the containing space of the LCD cell.

Consider, for example, the case of an LCD cell manufactured to hold more than necessary amount of liquid crystal within its containing space. In this case, a first chamber 1213A shown in FIG. 15 can be opened to the main containing space by breaking down its wall toward the containing space. This can be implemented utilizing, for example, the laser irradiation method described above. When the chamber 1213A is opened to the main containing space 1206 the cell 1210, a predetermined amount of excessive liquid crystal can be discharged into this chamber. If this discharge of liquid crystal into the storage chamber 1213A achieves the reduction of the total amount of liquid crystal in the containing space 1206 of the cell 1210 down to the normal level, the cell 1210 is repaired and salvaged. If, however, one single storage chamber 1213A is not sufficient to reduce the total liquid crystal amount down to normal, more storage chambers can be used. As is illustrated in FIG. 15, a second storage chamber 1213B is opened to receive its share of excessive liquid crystal from the main containing space of the cell assembly 1210. The rework scheme of opening up storage chambers to the main containing space can be repeated until the right total amount of liquid crystal in the cell's main containing space is achieved. FIG. 16 depicts an example of another rework in accordance with the present invention.

Reworked LCD cells 1100, 1210 and 1310 illustrated in FIGS. 14, 15 and 16 respectively become ones holding an adequate amount of liquid crystal within their containing spaces and are now able to qualify quality control. Due to the innovative LCD cell construction and the rework scheme thus possible, these cells are therefore salvation from defective products that would otherwise have to be wasted.

As is comprehensible to those skilled in the art, each of the storage chambers for the LCD cell assembly described in FIGS. 14 to 16 may be made to maintain a negative air pressure, preferably vacuum, when they were formed. This is relatively easy since ODF procedure to fill liquid crystal is normally conducted in a vacuum operating space. Such negative pressure assists in the automatic sucking of excessive liquid crystal into themselves from the main containing space. This negative-pressure arrangement in all storage chambers is advantageous in that the withdraw of excessive liquid crystal from the cell main containing space produces no contaminating liquid crystal droplets to be removed off the LCD cell assembly. All the excessive liquid crystal material remains on-board, virtually eliminating the contamination problem for the subsequent fabrication processing steps of the cell assembly.

Preferably, the main enclosing sealing member 711 for the containing space and the sealant for the array of excessive liquid crystal storage chambers 713 are radiation-hardened sealant. Radiation-cured sealant materials such as UV-hardened ones are more preferable than heat-cured.

Although not shown in the drawings, an LCD cell constructed in accordance with a preferred embodiment of the present invention may have the deployment of a matrix of regularly-populated spacers between its two substrates. Spacers are used inside the liquid crystal-containing space of the cell to assist to support the rigidity of the thin and large-area substrates in order to prevent both from collapsing toward each other.

As is known to those in the art, lower spacer population density allows for relatively larger process window, which leads to easier manipulation and better result of ODF schemes in the fabrication of LCD cells. On the other hand, however, higher spacer population density means higher cell mechanical rigidity, a highly-desirable characteristics. Spacer population density inside the liquid crystal-containing space of conventional LCD cells produced employing ODF procedure must, due to fabrication process window considerations, be below approximately 0.15%, measuring the total spacer footprint area with respect to overall LCD cell display area. In LCD cells manufactured in accordance with the teaching of the present invention, this disadvantageous limitation does not apply. Preferred spacer population density inside the liquid crystal-containing space of present invention can be advantageously much higher than that of the conventional cells.

While the above is a full description of the specific embodiments, various modifications, alternative constructions and equivalents may be used. Although the LCD cell structure of the present invention allows for the reworking adjustment of the release of the excessiveness of the liquid crystal into the storage space, it does not imply that all cells manufactured require this rework processing. This is particularly true in an established and experienced LCD manufacturing facility implementing the idea of the present invention. With this possibility of allowing a rework, cells that would originally have to be discarded due to the enclosure of an incorrect amount of liquid crystal can now be salvaged and reworked into a fully-qualified cell. Therefore, the above description and illustrations should not be taken as limiting the scope of the present invention which is defined by the appended claims.

What is claimed is:

1. A method of manufacturing a liquid crystal display device having first and second substrates, comprising:
deploying a sealing member on said first substrate, said sealing member forming a perimeter encircling a display area of said liquid crystal display device;
delivering at least one drop of liquid crystal on one of said first and said second substrates within said perimeter of said sealing member;
placing said second substrate on said sealing member, wherein said first and said second substrates sandwich said sealing member and are aligned to each other;
after delivering the at least one drop of liquid crystal and after placing said second substrate on said sealing member, breaking an opening in the sealing member;
discharging any excessive liquid crystal trapped within said perimeter out of said liquid crystal display device through said opening; and
plugging said opening to enclose an amount of liquid crystal within said perimeter.

2. The method of claim 1, wherein deploying said sealing member comprises deploying said sealing member formed of a radiation hardened material.

3. The method of claim 1, wherein said plugging is implemented using a radiation hardened material.

4. The method of claim 1, further comprising:
forming a matrix of color filters on a surface of one of said first and said second substrates; and
forming a matrix of thin-film transistors on a surface of the other of said first and said second substrates.

5. The method of claim 1, further comprising:
forming a matrix of color filters of a color-filter-on-array type on a surface of one of said first and said second substrates; and
forming a common electrode on a surface of the other of said first and said second substrates.

6. The method of claim 1, further comprising:
forming a spacer on a surface of one of said first and said second substrates.

7. The method of claim 6, wherein forming said spacer is part of forming a matrix of spacers.

8. The method of claim 7, wherein a population density of the spacers is approximately 0.15% to 2% of an overall liquid crystal display area.

9. The method of claim 1, wherein said breaking the opening in the sealing member is achieved by laser beam.

10. A method of manufacturing a liquid crystal display device having first and second substrates, comprising:
deploying a sealing member on said first substrate, wherein said sealing member comprises:

a first portion on a periphery of the liquid crystal display device; and a second portion forming a channel;

wherein one end of said channel is sealed by said first portion and the other end of said channel is open;

delivering at least one drop of liquid crystal on one of said first and said second substrates within said sealing member;

placing said second substrate on said sealing member, wherein said first and said second substrates sandwich said sealing member;

breaking said sealed end of the second portion of said sealing member to form an opening;

discharging any excessive liquid crystal trapped within said sealing member out of said liquid crystal display device through said opening; and plugging said opening to enclose an amount of liquid crystal within said sealing member.

11. The method of claim 10, wherein deploying said sealing member comprises deploying said sealing member formed of a radiation hardened material.

12. The method of claim 10, wherein said plugging is implemented using a radiation hardened material.

13. The method of claim 10, further comprising:
forming a matrix of color filters on a surface of one of said first and said second substrates; and
forming a matrix of thin-film transistors on a surface of the other of said first and said second substrates.

14. The method of claim 10, further comprising:
forming a matrix of color filters of a color-filter-on-array type on a surface of one of said first and said second substrates; and
forming a common electrode on a surface of the other of said first and said second substrates.

15. The method of claim 10, further comprising:
forming a spacer on a surface of one of said first and said second substrates.

16. The method of claim 15, wherein forming the spacer is part of forming a matrix of regularly-populated spacers.

17. The method of claim 16, wherein a population density of the spacers is approximately 0.15% to 2% of an overall liquid crystal display area.

18. The method of claim 10, wherein said breaking the sealed end to form the opening is achieved by laser beam.

* * * * *